United States Patent
Lee et al.

(10) Patent No.: US 10,640,076 B2
(45) Date of Patent: May 5, 2020

(54) VEHICLE AIRBAG

(71) Applicant: Ford Global Technologies, LLC, Dearborn, MI (US)

(72) Inventors: Juyoung Lee, West Bloomfield, MI (US); Marwan Ahmad Elbkaily, Canton, MI (US); Jonathan Clarke, Troy, MI (US); Eric A. Smitterberg, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 15/916,680

(22) Filed: Mar. 9, 2018

(65) Prior Publication Data

US 2019/0275977 A1    Sep. 12, 2019

(51) Int. Cl.
*B60R 21/233* (2006.01)
*B60R 21/232* (2011.01)
*B60R 21/213* (2011.01)
*B60R 21/239* (2006.01)
*B60R 21/2338* (2011.01)

(52) U.S. Cl.
CPC .......... *B60R 21/233* (2013.01); *B60R 21/213* (2013.01); *B60R 21/232* (2013.01); *B60R 21/239* (2013.01); *B60R 2021/23316* (2013.01); *B60R 2021/23324* (2013.01); *B60R 2021/23382* (2013.01); *B60R 2021/23386* (2013.01)

(58) Field of Classification Search
CPC .... B60R 2021/0009; B60R 2021/0023; B60R 2021/0048; B60R 2021/23308; B60R 2021/23316; B60R 2021/23324; B60R 2021/23382; B60R 2021/23386; B60R 2021/2395; B60R 21/213; B60R 21/231; B60R 21/232; B60R 21/233; B60R 21/2338; B60R 21/239
See application file for complete search history.

(56) References Cited

U.S. PATENT DOCUMENTS

| | | | | |
|---|---|---|---|---|
| 5,575,497 A | * | 11/1996 | Suyama | B60R 21/231 280/730.1 |
| 6,073,960 A | * | 6/2000 | Viano | B60R 21/231 280/730.1 |
| 6,851,706 B2 | * | 2/2005 | Roberts | B60R 21/23138 280/730.1 |
| 7,549,672 B2 | * | 6/2009 | Sato | B60R 21/207 280/729 |
| 7,618,057 B2 | | 11/2009 | Pinsenschaum et al. | |

(Continued)

FOREIGN PATENT DOCUMENTS

JP    2018030446 A  *  3/2018
WO    2011090148 A1    7/2011

*Primary Examiner* — Laura Freedman
(74) *Attorney, Agent, or Firm* — Frank A. MacKenzie; Bejin Bieneman PLC (57) ABSTRACT

A vehicle includes a first member inflatable to an inflated position in which the first member has a first and a second distal edge spaced from each other along a vehicle-longitudinal axis. The vehicle includes a second member inflatable to an inflated position, the second member in the inflated position being on a cross-vehicle axis that extends through the first distal edge. The vehicle includes a one-way vent permitting fluid flow from the first member to the second member.

20 Claims, 10 Drawing Sheets

(56) References Cited

U.S. PATENT DOCUMENTS

| | | | | |
|---|---|---|---|---|
| 7,726,684 | B2 | 6/2010 | Breed | |
| 7,988,187 | B2 * | 8/2011 | Yamamura | B60R 21/232 280/730.2 |
| 8,020,888 | B2 | 9/2011 | Cheal et al. | |
| 8,408,591 | B2 | 4/2013 | Walston | |
| 8,622,420 | B2 | 1/2014 | Kato et al. | |
| 8,746,734 | B1 * | 6/2014 | Smith | B60R 21/239 280/729 |
| 8,876,153 | B2 * | 11/2014 | Dix | B60R 21/233 280/729 |
| 8,894,094 | B2 * | 11/2014 | Wang | B60R 21/232 280/730.2 |
| 8,967,660 | B2 * | 3/2015 | Taguchi | B60R 21/233 280/729 |
| 8,998,250 | B2 * | 4/2015 | Kruse | B60R 21/232 280/729 |
| 9,108,588 | B2 * | 8/2015 | Fukawatase | B60R 21/233 |
| 9,114,777 | B2 * | 8/2015 | Fukawatase | B60R 21/232 |
| 9,126,558 | B2 * | 9/2015 | Kawamura | B60R 21/213 |
| 9,340,176 | B2 | 5/2016 | Belwafa et al. | |
| 9,533,652 | B1 | 1/2017 | Paxton et al. | |
| 9,539,978 | B2 * | 1/2017 | Mazanek | B60R 21/232 |
| 9,701,272 | B2 * | 7/2017 | Massa | B60R 21/213 |
| 9,809,189 | B2 * | 11/2017 | Grell | B60R 21/232 |
| 9,862,350 | B2 * | 1/2018 | Guerrero | B60R 21/233 |
| 9,969,346 | B2 * | 5/2018 | Patel | B60R 21/233 |
| 10,131,314 | B2 * | 11/2018 | Yoo | B60R 21/239 |
| 2011/0012328 | A1 | 1/2011 | Ewing et al. | |
| 2016/0288762 | A1 | 10/2016 | Deng et al. | |

* cited by examiner

FIG. 10

VEHICLE AIRBAG

BACKGROUND

A vehicle may include one or more airbags deployable during vehicle impacts to absorb energy from occupants of the vehicle during the impact. The airbag may be a component of an airbag assembly including a housing supporting the airbag, and an inflation device in communication with the airbag for inflating the airbag from an uninflated position to an inflated position.

DETAILED DESCRIPTION

A vehicle includes a first member inflatable to an inflated position in which the first member has a first and a second distal edge spaced from each other along a vehicle-longitudinal axis. The vehicle includes a second member inflatable to an inflated position, the second member in the inflated position being on a cross-vehicle axis that extends through the first distal edge. The vehicle includes a one-way vent permitting fluid flow from the first member to the second member.

The vehicle may include a pillar abutting the first member and the second member in the inflated positions.

The pillar may include a handle between the first member and the second member in the inflated positions.

The first member may include a panel and the second member may include a panel, the panel of the first member adhesively fixed to the panel of the second member and including a plurality of bumps along a perimeter surrounding the one-way vent.

The first member may include a hole, and the one-way vent may include a strap covering the hole.

The second member may include a panel having a pair of slits with the strap therebetween.

The one-way vent may extend from the first member into the second member and define a passage elongated from a first end to a second end.

The second member in the inflated position may extend away from the second distal edge and past the first distal edge.

An airbag includes a first member inflatable to an inflated position in which the first member has a first and a second distal edge spaced from each other along a first axis. The airbag includes a second member inflatable to an inflated position, the second member in the inflated position being on a second axis that is perpendicular to the first axis and extends through the first distal edge. The airbag includes a one-way vent permitting fluid flow from the first member to the second member.

The first member may include a panel, and the second member may include a panel, the panel of the first member abutting the panel of the second member in the inflated positions.

The panel of the first member may be adhesively fixed to the panel of the second member at a perimeter surrounding the one-way vent.

One of the panel of the first member and the panel of the second member may include a plurality of bumps along the perimeter surrounding the one-way vent.

The panel of the first member may include a hole, and the one-way vent may include a strap covering the hole.

The panel of the second member may include a pair of slits with the strap therebetween.

The panel of the second member and the strap may be monolithic.

The one-way vent may include a first panel and a second panel elongated between a first end and a second end and defining a passage extending from the first end to the second end.

The one-way vent may extend from the first member into the second member.

The airbag may include a tether in the second member and having a first end fixed to the one-way vent and a second end fixed to the second member.

The first panel and the second panel of the one-way vent may each include a hole at the second end.

The first member may include a first panel and a second panel, and the one-way vent may be fixed to the first panel and the second panel.

The second member in the inflated position may extend away from the second distal edge and past the first distal edge.

With reference to the Figures, wherein like numerals indicate like parts throughout the several views, a vehicle 20 has an airbag 22, 122 that includes a first member 24, 124 inflatable to an inflated position in which the first member 24, 124 has a first distal edge 26 and a second distal edge 28 spaced from each other along a first axis, e.g., a vehicle-longitudinal axis A1. The airbag 22, 122 includes a second member 30, 130 inflatable to an inflated position, the second member 30, 130 in the inflated position being on a second axis that is perpendicular to the first axis, e.g., a cross-vehicle axis A2, that extends through the first distal edge 26. The airbag 22, 122 includes a one-way vent 32, 132 permitting fluid flow from the first member 24, 124 to the second member 30, 130.

The first member 24, 124 and the second member 30, 130 in the inflated positions control kinematics of the occupants inside the vehicle 20 during a vehicle impact.

The vehicle 20, shown in FIGS. 1, 2, 4-6, and 8-10, may be any passenger or commercial automobile such as a car, a truck, a sport utility vehicle, a crossover vehicle, a van, a minivan, a taxi, a bus, etc. The vehicle 20 may include a roof 36, one or more airbag assemblies 38, one or more pillars 34, etc.

The vehicle 20 defines the vehicle-longitudinal axis A1, i.e., extending between a front and a rear of the vehicle 20. The vehicle 20 defines the cross-vehicle axis A2, i.e., extending between a left side and a right side of the vehicle 20. The vehicle 20 defines a vehicle-vertical axis A3, i.e., extending between a top and a bottom of the vehicle 20. The vehicle-longitudinal axis A1, the cross-vehicle axis A2, and the vehicle-vertical axis A3 may all be perpendicular to each other. The front, rear, left side, right side, top, and bottom may be relative to an orientation of an operator of the vehicle 20. The front, rear, left side, right side, top, and bottom may be relative to an orientation of controls for operating the vehicle 20, e.g., an instrument panel, etc. The front, rear, left side, right side, top, and bottom may be relative to a forward driving direction when wheels of the vehicle 20 are all parallel with each other, etc.

The roof 36 provides cover for occupants for the vehicle 20. The roof 36 may include an interior panel, an exterior panel, and a headliner. The interior panel provides support to the exterior panel, the headliner, etc. The interior panel may be steel, aluminum, carbon fiber, or any other suitable material. The headliner and the exterior panel provide class-A surfaces to the roof 36, i.e., surfaces specifically manufactured to have a high-quality, finished aesthetic appearance free of blemishes, etc.

The pillars 34 support the roof 36. The pillars 34 may be spaced from each other along the vehicle-longitudinal axis A1, e.g., the pillars 34 may be an A-pillar, a B-pillar, etc. The pillars 34 may each include a handle 40. An occupant of the vehicle 20 may grasp the handle 40 to stabilize themselves relative to the vehicle 20.

The vehicle 20 may include a windshield 42. The windshield 42 protects occupants of the vehicle 20 and permits such occupants to see therethrough. The windshield 42 may be supported by the pillar 34, e.g., between a pair of A-pillars.

The airbag assembly 38 may include a housing 44, an inflator 46, and the airbag 22, 122. The inflator 46 and the airbag 22, 122 in the uninflated position may be disposed in the housing 44. The housing 44 provides a reaction surface for the airbag 22, 122 in the inflated position. The housing 44 may be supported by the roof 36, or any other suitable vehicle 20 structure. The housing 44 may be any suitable material, e.g., a rigid polymer, a metal, a composite, etc.

The airbag 22, 122 may be a woven polymer or any other material. As one example, the airbag 22, 122 may be a woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The first member 24, 124 is inflatable to the inflated position, shown in FIGS. 2-9. In the inflated position the first distal edge 26 and the second distal edge 28 of the first member 24, 124 are spaced from each other along the first axis, e.g., along the vehicle-longitudinal axis A1. The first distal edge 26 may be closer to the front of the vehicle 20 than the second distal edge 28. The second distal edge 28 may be closer to the rear of the vehicle 20 than the first distal edge 26. The airbag 22, 122 may be elongated between the first distal edge 26 and the second distal edge 28, e.g., along the vehicle-longitudinal axis A1.

The first member 24, 124 may include a first panel 48, 148 and a second panel 50, 150. The first panel 48, 148 and the second panel 50, 150 may define a chamber 52 therebetween, as shown in FIGS. 4, 5, 8, and 9. The first panel 48, 148 may be inboard relative to the second panel 50, 150, e.g., along the cross-vehicle axis A2. The put it another way, the first panel 48, 148 may be closer to a center of the vehicle 20 than the second panel 50, 150. The first panel 48, 148 may be fixed to the second panel 50, 150, e.g., with stitching, adhesives, friction welding, etc., e.g., at the first distal edge 26 and the second distal edge 28. The first panel 48, 148 and the second panel 50, 150 may be monolithic, i.e., a one-piece construction. For example, the first panel 48, 148 and the second panel 50, 150 may be a single sheet of woven polymer.

With reference to the embodiment shown in FIGS. 2-5, the first member 24 may include one or more holes 54. The holes 54 may be in the first panel 48. The holes 54 may be in communication with the chamber 52, i.e., such that fluid may flow out of chamber 52 through the holes 54.

The first member 24 may include a plurality of bumps 56 along a perimeter 58 surrounding the hole(s) 54. The bumps 56 provide increased adhesion, e.g., when the first member 24 is fixed to the second member 30 with an adhesive. The bumps 56 may extend inwardly, i.e., toward the chamber 52. The bumps 56 may extend outwardly, e.g., away from the chamber 52.

With reference again to FIGS. 2-9, the second member 30, 130 is inflatable to the inflated position. The second member 30, 130 in the inflated position is on the cross-vehicle axis A2. The cross-vehicle axis A2 may extend through the first distal edge 26, as shown in FIGS. 4, 5, 8, and 9. To put it another way, the second member 30,130 in the inflated position and the first distal edge 26 may be a common distance from the front of the vehicle 20. For example, the second member 30, 130 in the inflated position may be inboard of the first member 24, 124 in the inflated position at the first distal edge 26. The second member 30, 130 in the inflated position may abut the windshield 42.

The second member 30 may include a first panel 60, 160 and a second panel 62, 162. The first panel 60, 160 and the second panel 62, 162 may define a chamber 64 therebetween, as shown in FIGS. 4, 5, 8, and 9. The first panel 60, 160 may be inboard relative to the second panel 62, 162. The put it another way, the first panel 60, 160 may be closer to the center of the vehicle 20 than the second panel 62, 162. The first panel 60, 160 may be fixed to the second panel 62, 162, e.g., with stitching, adhesives, friction welding, etc., e.g., at one or more edges of the first panel 60, 160 and the second panel 62, 162. The first panel 60, 160 and the second panel 62, 162 may be monolithic, i.e., a one-piece construction. For example, the first panel 60, 160 and the second panel 62, 162 may be a single sheet of woven polymer.

With reference to the embodiment shown in FIGS. 2-5, the second member 30 may include one or more pairs of slits 66. The pairs of slits 66 may be in the second panel 62. The slits 66 of each pair of slits 66 may have a same length. The slits 66 of each pair of slits 66 may be parallel with each other.

The second member 30 may include a plurality of bumps 68 along a perimeter 70 surrounding the pair(s) of slits 66. The bumps 68 provide increased adhesion, e.g., when the second member 30 is fixed to the first member 24 with an adhesive. The bumps 68 may extend inwardly, i.e., toward the chamber 64. The bumps 68 may extend outwardly, e.g., away from the chamber 64.

Figure 1:
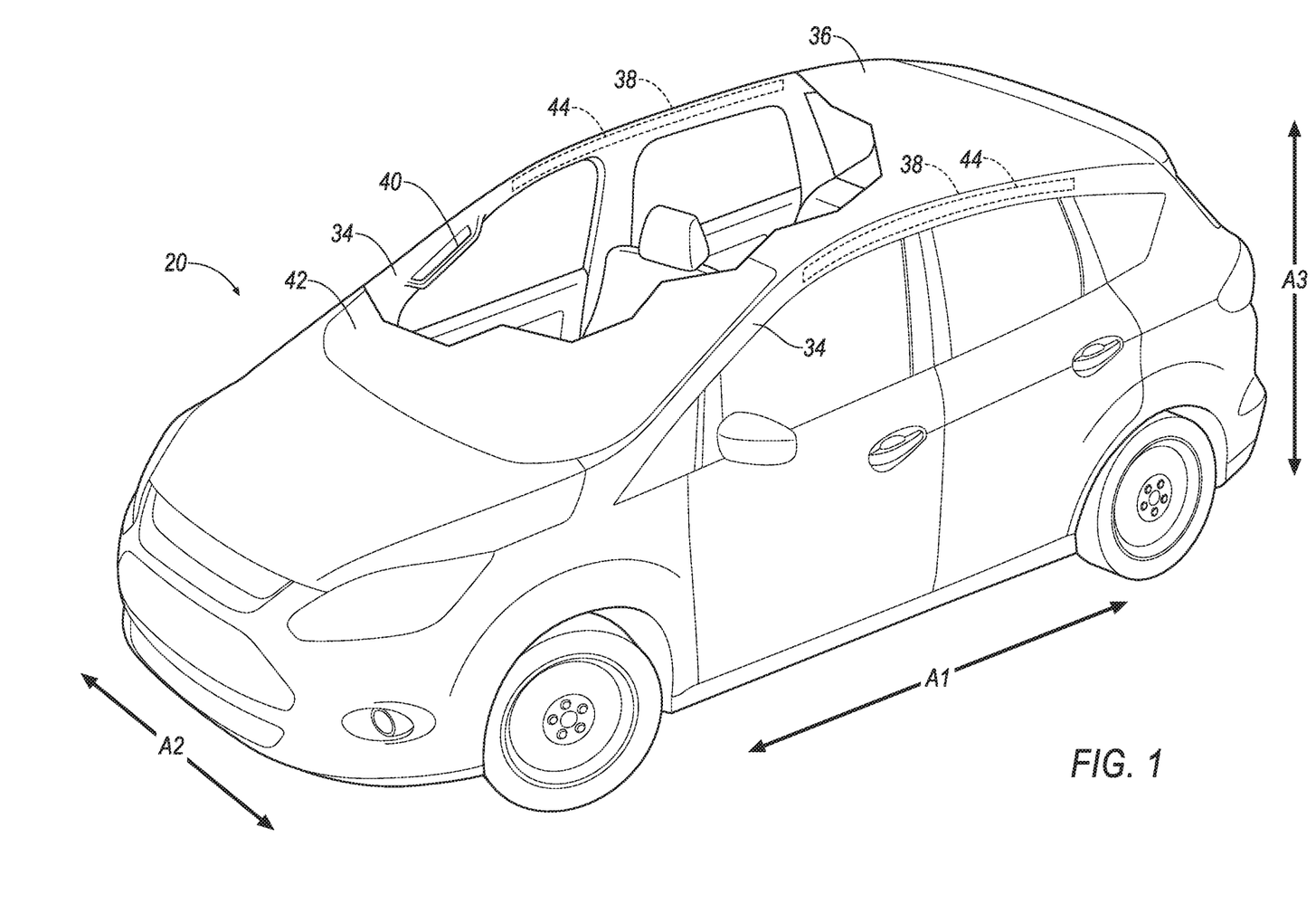
FIG. 1 is a perspective view of a vehicle with an airbag in an uninflated position.
Figure 2:
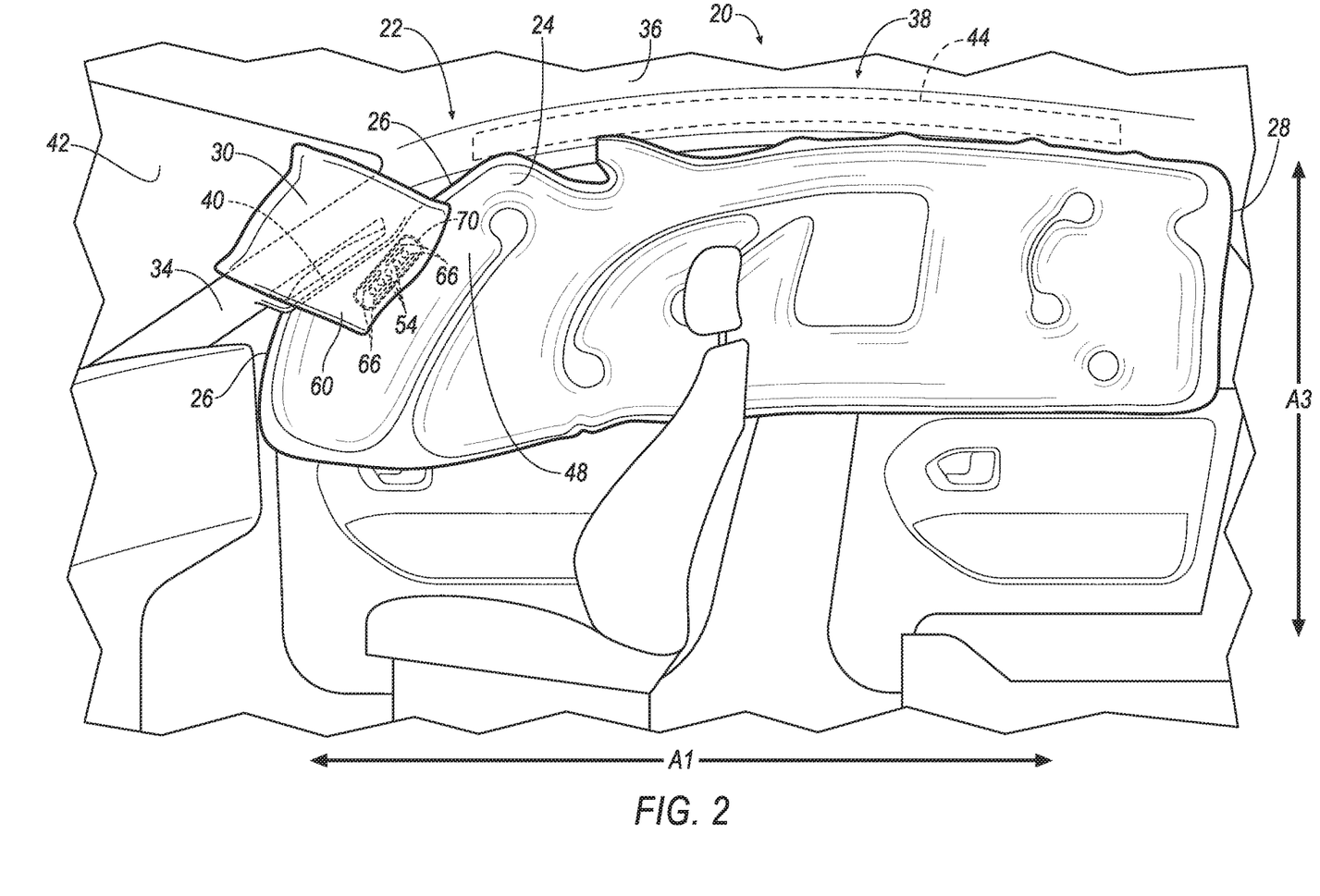
FIG. 2 is a side view of an interior of the vehicle and the airbag in an inflated position.

The second member 30 in the inflated position may extend away from the second distal edge 28 of the first member 24 and past the first distal edge 26 of the first member 24, as shown in FIG. 2. For example, the second member 30 in the inflated position may extend along the vehicle-longitudinal axis A1 toward the front of the vehicle 20 farther than the first member 24 in the inflated position. The first panel 48 of the first member 24 in the inflated position may abut the second panel 62 of the second member 30 in the inflated position.

With reference to the embodiment shown in FIGS. 6-9, the second member 130 in the inflated position may extend transversely from the first member 124. For example, the first member 124 may be elongated along the vehicle-longitudinal axis A1, and the second member 130 may extend from the first member 124 transverse to the vehicle-longitudinal axis A1, e.g., along the cross-vehicle axis A2.

The first member 24, 124 and the second member 30, 130 may be fixed to each other, e.g., via stitching, adhesive, being monolithic, etc. For example, in the embodiment shown in FIGS. 2-5, the first member 24 may be fixed to the second member 30 at the perimeter 58 surrounding the hole(s) 54 and the perimeter 70 surrounding the pair(s) of slits 66. An adhesive, such as a silicone based adhesive, stitching, etc., may fix the first panel 48 of the first member 24 to the second panel 62 of the second member 30 at the perimeters 58, 70. To put it another way, the perimeters 58, 70 may be aligned with, and fixed to, each other. As another example, in the embodiment shown in FIGS. 6-9, the second member 130 may be fixed to the first panel 148 and/or the second panel 150 of the first member 130, e.g., via stitching, friction welding, adhesive, etc.

The first member 24, 124 in the inflated position and/or the second member 30, 130 in the inflated position may abut the pillar 34, as shown in FIGS. 4, 5, 8, and 9, e.g., to restrict movement of an occupant of the vehicle relative to the pillar 34. For example, the second panel 62, 162 of the second member 30, 130 in the inflated position may abut the pillar 34.

The first member 24, 124 in the inflated position and/or the second member 30, 130 in the inflated position may abut the handle 40, e.g., to restrict movement of an occupant of the vehicle relative to the handle 40. For example, the handle 40 may be between the first member 24, 124 and the second member 30, 130 in the inflated positions.

The one-way vent 32, 132, shown in FIGS. 3-5 and 7-9, is designed to permit fluid flow from the first member 24, 124 to the second member 30, 130. To put it another way, the one-way vent 32, 132 allows fluid to enter the chamber 64 of the second member 30, 130 from the chamber 52 of the first member 24, 124, and restricts fluid from exiting the chamber 64 of the second member 30, 130 to the chamber 52 of the first member 24, 124.

Figure 3:
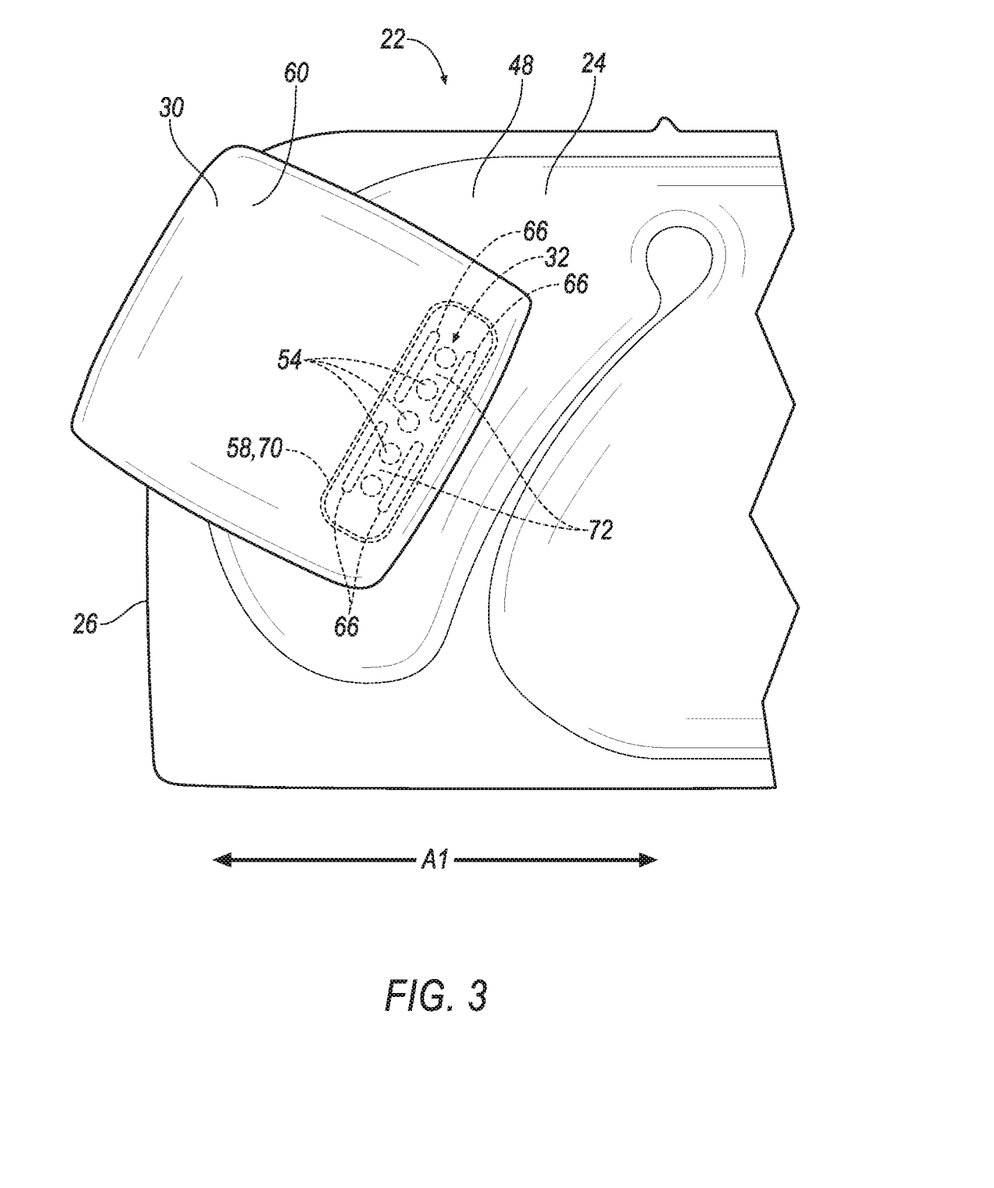
FIG. 3 is a side view of a portion of the airbag in the inflated position.
Figure 4:
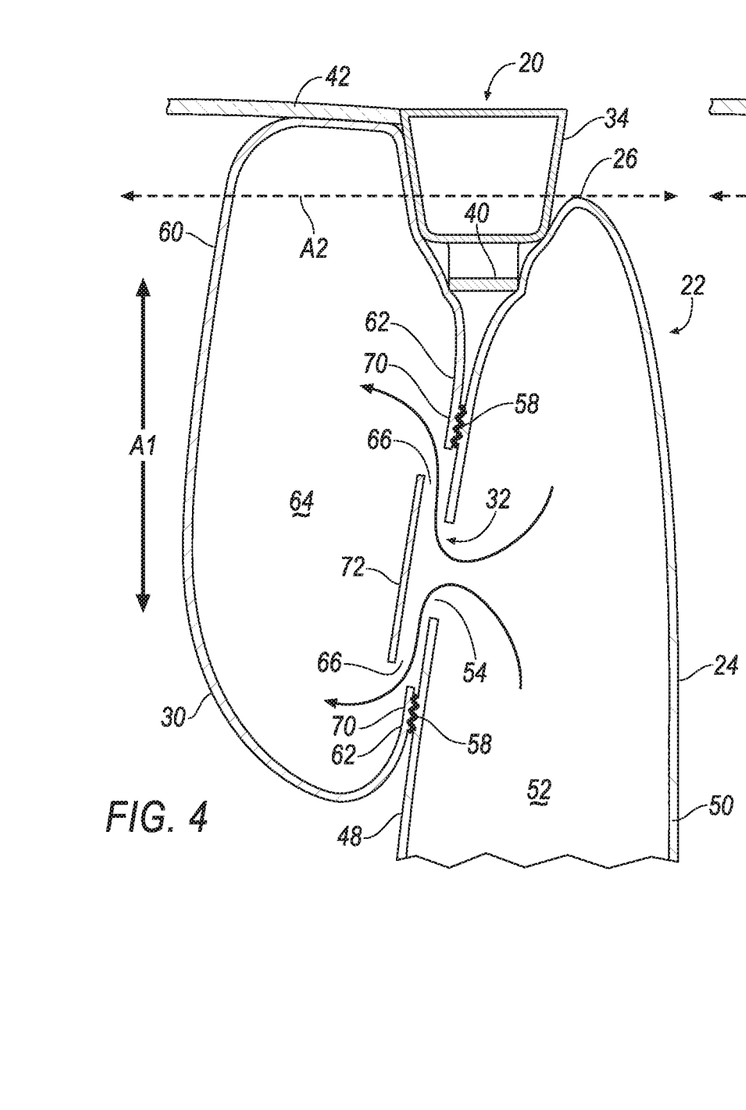
FIG. 4 is a cross section of a portion of the airbag in the inflated position.
Figure 5:
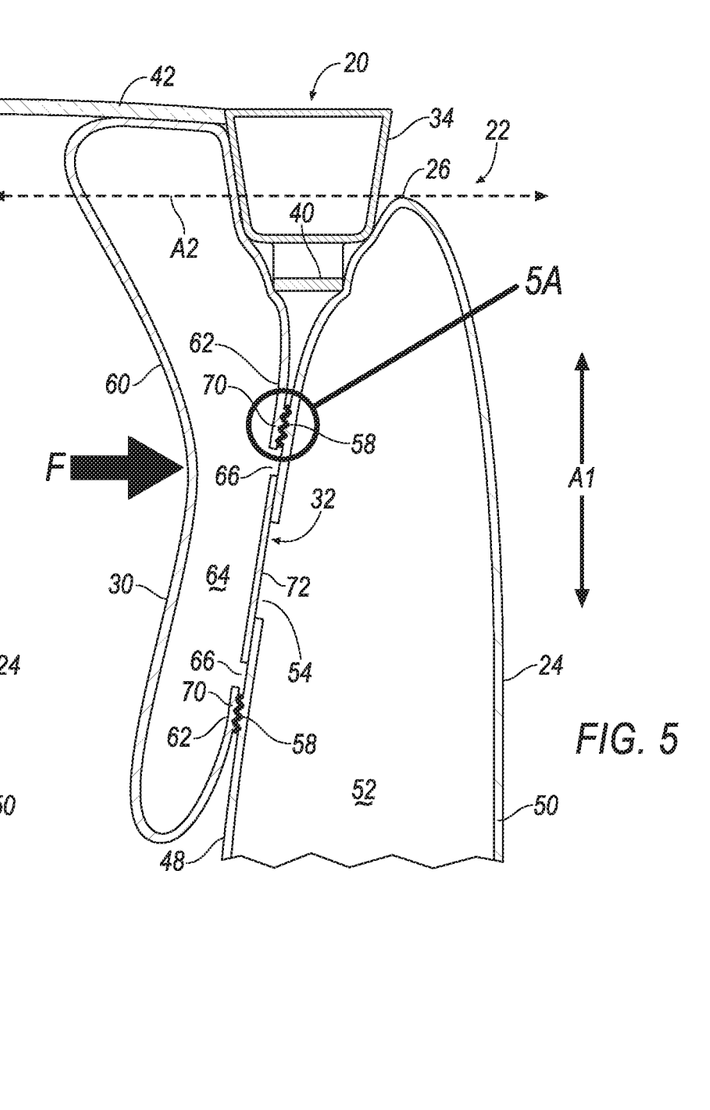
FIG. 5 is a cross section of a portion of the airbag in the inflated position with a force applied to the airbag.
Figure 5A:
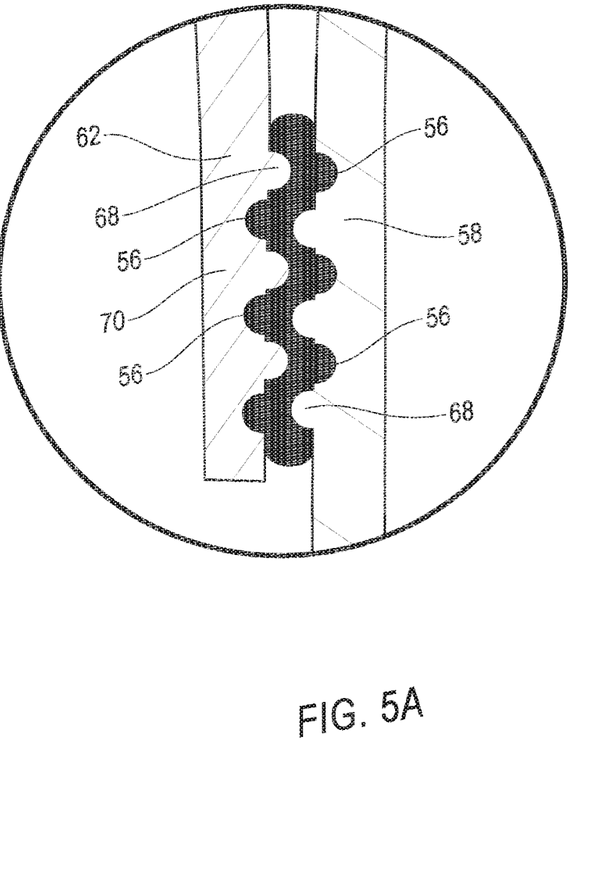
FIG. 5A is a magnified view of a portion of FIG. 5.
Figure 6:
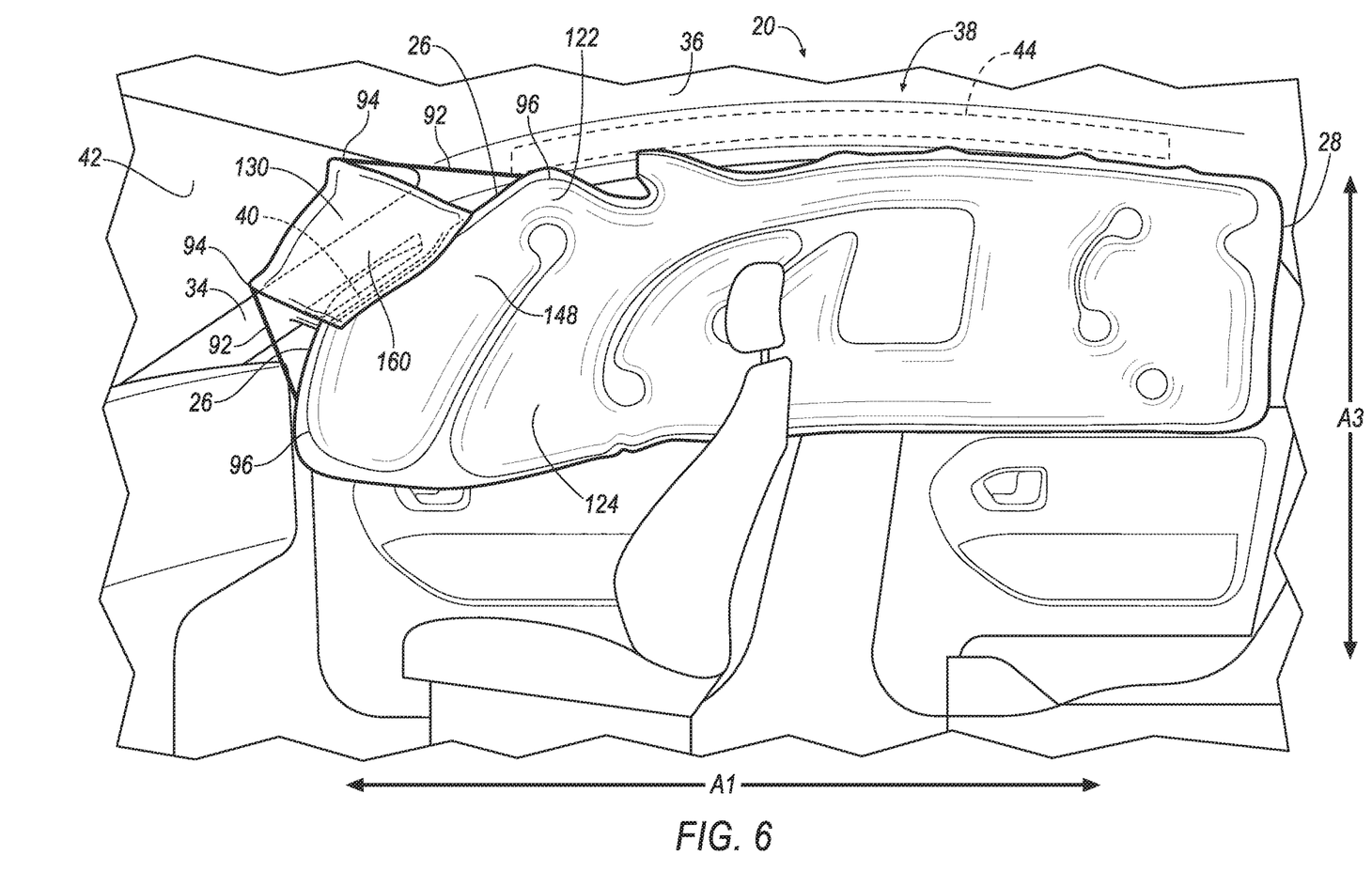
FIG. 6 is a side view of the interior of the vehicle and another airbag in an inflated position.

With reference to the embodiment shown in FIGS. 3-5, the one-way vent 32 may be in one or both of the perimeters 58, 70. To put it another way, the perimeter 58 surrounding the hole(s) 54, and/or the perimeter 70 surrounding the pair(s) of slits 66, may surround the one-way vent 32.

The one-way vent 32 may include a strap 72. The strap 72 covers the hole(s) 54. The strap 72 may abut the first panel 48 of the first member 24 about the holes 54. When fluid pressure in the chamber 52 of the first member 24 is greater than fluid pressure in the chamber 64 of the second member 30, such as during inflation of the members 24, 30, the differential of such pressures may urge the strap 72 away from the first panel 48 of the first member 24, permitting fluid to flow through the hole(s) 54 into the chamber 64 of the second member 30, as shown in FIG. 4. When fluid pressure in the chamber 64 of the second member 30 is greater than fluid pressure in the chamber 52 of the first member 24, such as when an occupant applies a force F to the second member 30 during a vehicle impact, the differential of such pressures may urge the strap 72 to abut the first panel 48 of the first member 24 about the hole(s) 54, restricting fluid flow through the hole(s) 54 out of the chamber 64 of the second member 30, as shown in FIG. 5. The strap 72 may be between the slits 66. The second panel 62 of the second member 30 and the strap 72 may be monolithic, i.e., a one-piece construction. The strap 72 may be fixed to the second panel 62 of the second member 30 and/or to the first panel 48 of the first member 24, e.g., via stitching, adhesive, etc.

Figure 7:
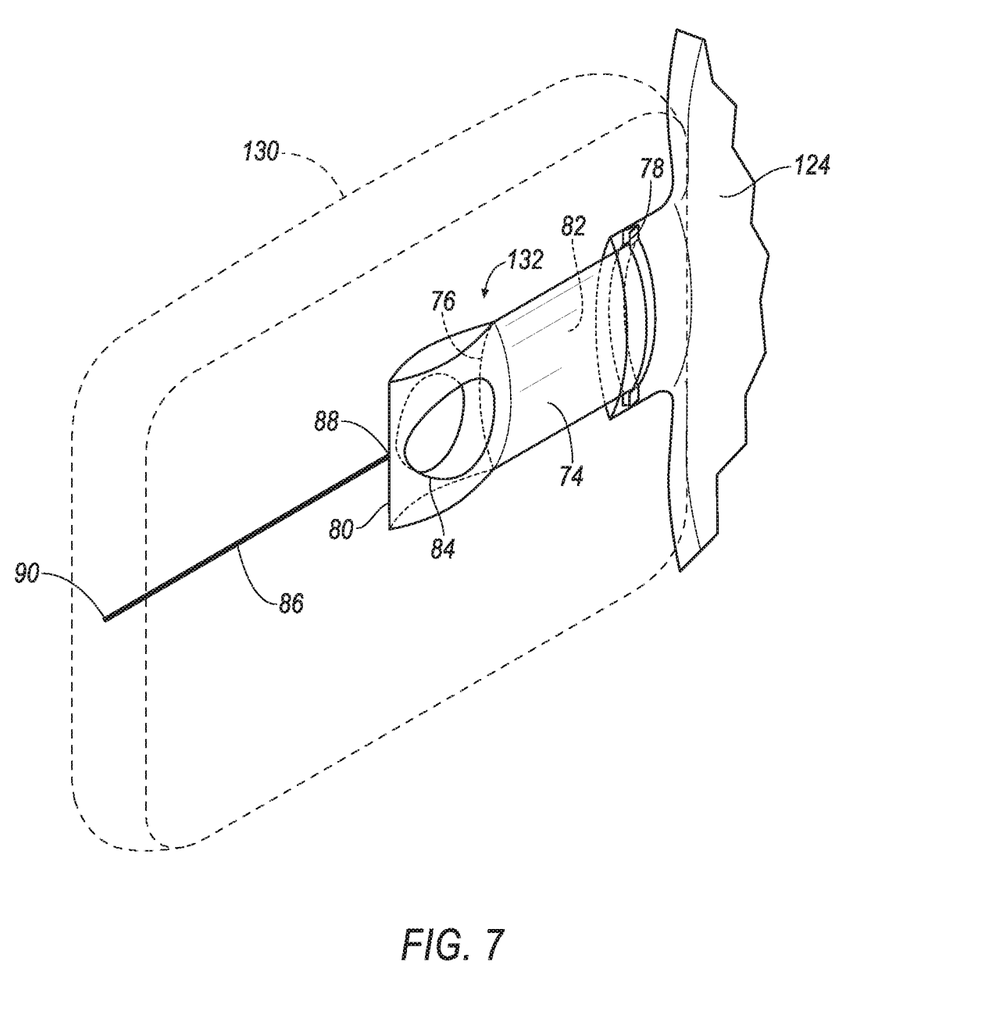
FIG. 7 is a perspective view of a portion of the airbag of FIG. 6 in the inflated position.
Figure 8:
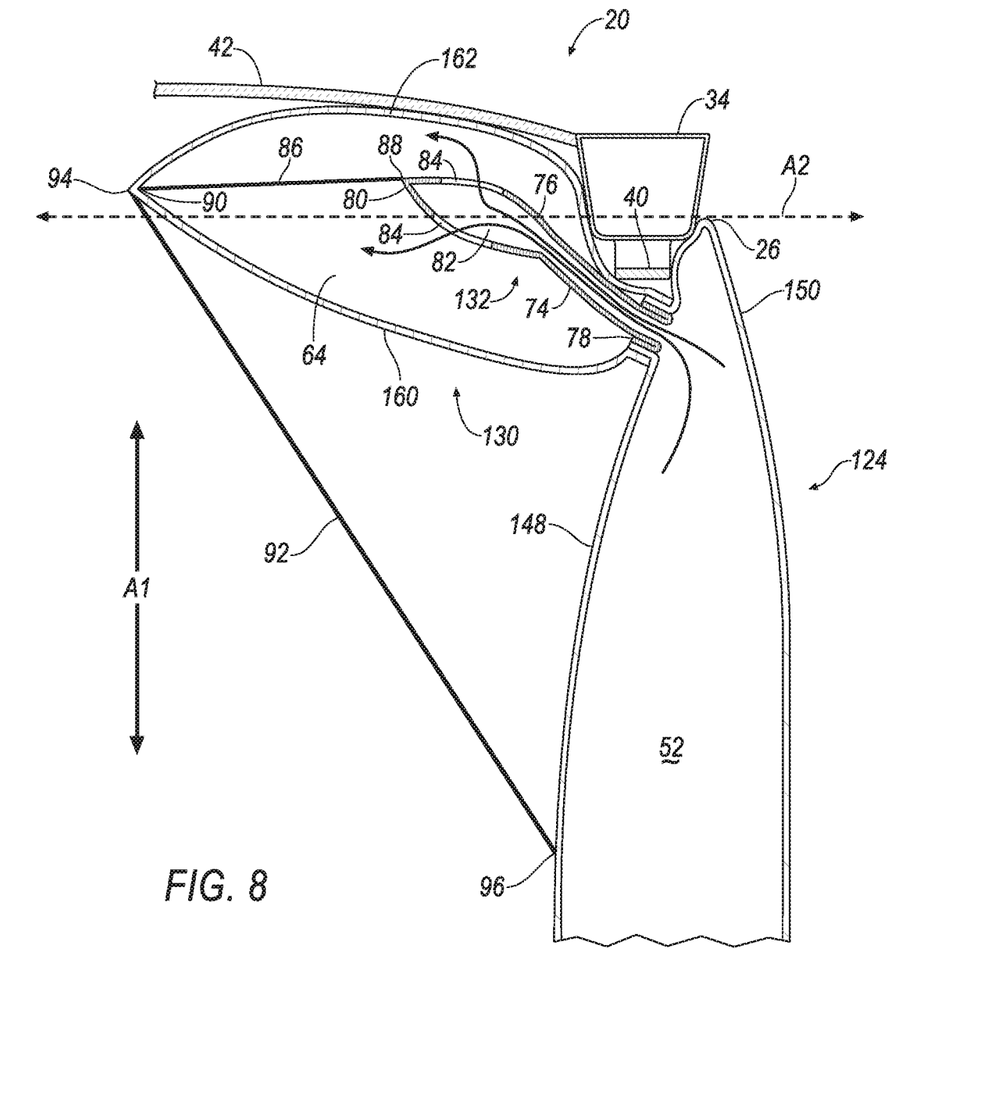
FIG. 8 is a cross section of the airbag of FIG. 6 in the inflated position.
Figure 9:
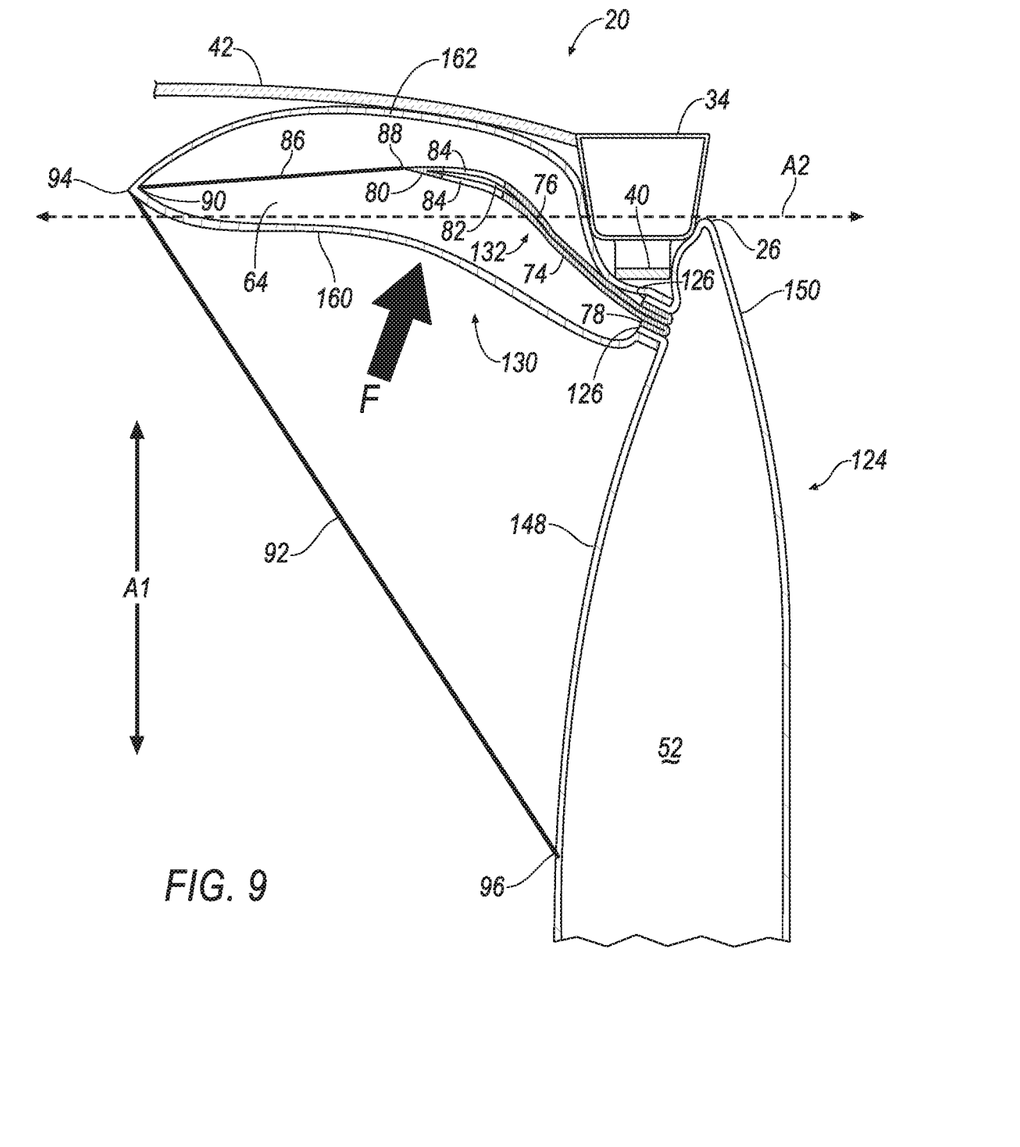
FIG. 9 is a cross section of the airbag of FIG. 6 in the inflated position with a force applied to the airbag.

With reference to the embodiment shown in FIGS. 7-9, the one-way vent 132 may include a first panel 74 and a second panel 76. The one-vent 132 may be elongated between a first end 78 and a second end 80. For example, the first panel 74 and the second panel 76 may be elongated from the first end 78 to the second end 80. The first panel 74 and second panel 76 may define a passage 82 therebetween. The passage 82 may be elongated from the first end 78 to the second end 80. For example, fluid may enter the passage 82 at the first end 78, and exit the passage 82 at the second end 80. The first panel 74 and the second panel 76 may be monolithic, i.e., a one-piece construction. The first panel 74 and the second panel 76 may be fixed to each other, e.g., via stitching, adhesive, etc. The first panel 74 and the second panel 76 may each include one or more hole(s) 84 at the second end 80. Fluid may flow out of the passage 82 at the second end 80 through the hole(s) 84.

The one-way vent 132 may extend from the first member 124 into the second member 130. For example, the first panel 74 and the second panel 76 of the one-way vent 132 may extend from the first member 124 into the chamber 64 of the second member 130. The first end 78 of the one-way vent 132 may be fixed to the first member 124 at the first panel 148 and/or the second panel 150, e.g., via stitching, friction welding, adhesive, etc. The one-way vent 132 and the first member 124 may be monolithic, i.e., a one-piece construction. For example, the first panel 148 and/or the second panel 150 of the first member 124 may be monolithic with the first panel 74 and/or the second panel 76 of the one-way vent 132.

When fluid pressure in the chamber 52 of the first member 124 is greater than fluid pressure in the chamber 64 of the second member 130, the differential of such pressures may cause fluid to enter the first end 78 of the one-way vent 132 and urge the first panel 74 and the second panel 76 of the one-way vent 132 away from each other, permitting fluid to flow through the passage 82 into the chamber 64 of the second member 130, as shown in FIG. 8. When fluid pressure in the chamber 64 of the second member 130 is greater than fluid pressure in the chamber 52 of the first member 124, such as when an occupant applies the force F to the second member 130 during a vehicle impact, the differential of such pressures may urge the first panel 74 and the second panel 76 of the one-way vent 132 toward each other, closing the passage 82 and restricting fluid flow out of the chamber 64 of the second member 130, as shown in FIG. 9.

The airbag 122 may include an internal tether 86, shown in FIGS. 7-9. The internal tether 86 maintains the one-way vent 132 in the second member 130. For example, when the fluid pressure in the chamber 64 of the second member 130 is greater than fluid pressure in the chamber 52 of the first member 124, the internal tether 86 prevents the pressure differential from urging the one-way vent 132 into the first member 124. To put it another way, the internal tether 86 prevents the one-way vent 132 from flipping inside-out.

The internal tether 86 may be in the second member 130. To put it another way, the internal tether 86 may be in the chamber 64 of the second member 130. The internal tether 86 may include a first end 88 and a second end 90 spaced from the first end 88. The first end 88 may be fixed to the one-way vent 132, e.g., at the second end 80 of the one-way vent 132. The second end 90 may be fixed to the second member 130, e.g., spaced from the second end 80 of the one-way vent 132 and between the first panel 160 and the second panel 162 of the second member 130. The internal tether 86 may be fixed via stitching, adhesive, etc. The internal tether 86 may be a same type of material as the second member 130. The internal tether 86 may be monolithic, i.e., a one-piece construction, with the first panel 74 and/or the second panel 76 of the one-way vent 132.

The airbag 122 may include one or more external tethers 92, shown in FIGS. 8 and 9. The external tethers 92 maintain the second member 130 in position relative to the first member 124, e.g., such that the second member 130 extends transversely from the first member 124. The external tethers 92 may be outside the first member 124 and the second member 130. To put it another way, the external tethers 92 may be outside the chamber 52 of the first member 124 and the chamber 64 of the second member 130. Each external tether 92 may include a first end 94 and a second end 96 spaced from the first end 94. The first end 94 may be fixed to the second member 130. The second end 96 may be fixed to the first member 124. The external tether 92 may be fixed via stitching, adhesive, etc. The external tether 92 may be a same type of material as the first member 124 and/or the second member 130. The external tether 92 may be monolithic, i.e., a one-piece construction, with the first member 124 and/or the second member 130.

Figure 10:
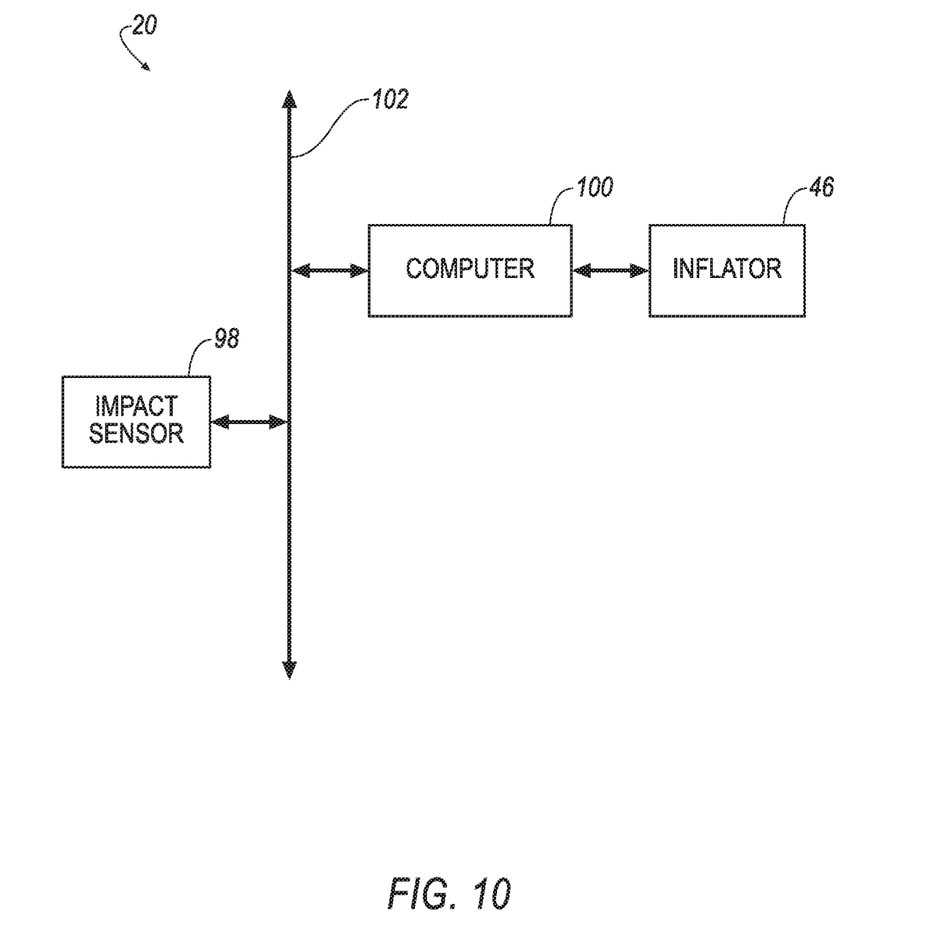
FIG. 10 is a schematic of components of the vehicle.

The inflator 46, shown in FIG. 10, provides inflation medium to inflate the first member 24, 124 and the second member 30, 130 from the uninflated positions to the inflated positions. The inflator 46 may be in fluid communication with the airbag 22, 122, e.g., directly, through various piping, etc. The inflator 46 may be, for example, a pyrotechnic inflator that uses a chemical reaction to drive inflation medium to the airbag 22, 122. The inflator 46 may be of any suitable type, for example, a cold-gas inflator. The inflator 46 may be supported by the housing 44, the roof 36, or by any other suitable location of the vehicle 20. One or more inflator 46 may be used to inflate the first member 24, 124 and the second member 30, 130.

The vehicle 20 may include at least one impact sensor 98 for sensing impact of the vehicle 20, and a computer 100 in communication with the impact sensor 98 and the inflator 46, as shown in FIG. 10. The computer 100 may activate the inflator 46, e.g., to provide an impulse to a pyrotechnic charge of the inflator 46 when the impact sensor 98 senses an impact of the vehicle 20. Alternatively or additionally to sensing impact, the impact sensor 98 may be configured to sense impact prior to impact, i.e., pre-impact sensing.

The impact sensor 98 may be in communication with the computer 100. The impact sensor 98 is configured to detect an impact to the vehicle 20. The impact sensor 98 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 98 may be located at numerous points in or on the vehicle 20.

The computer 100 and the impact sensor 98 may be connected to a communication bus 102, such as a controller area network (CAN) bus, of the vehicle 20. The computer 100 may use information from the communication bus 102 to control the activation of the inflator 46. The inflator 46 may be connected directly to the computer 100, as shown in FIG. 10, or the inflator 46 may be connected via the communication bus 102.

The computer 100 may be a microprocessor-based computer implemented via circuits, chips, or other electronic components. For example, the computer 100 may include a processor, a memory, etc. The memory of the computer 100 may include memory for storing programming instructions executable by the processor as well as for electronically storing data and/or databases. The computer 100 may store instructions executable by the processor to actuate the airbag 22, 122 in response to detecting a vehicle impact. For example, upon detecting a vehicle impact, e.g., based on information from the impact sensor 98, the computer 100 may instruct the inflator 46 to inflate the airbag 22, 122.

In operation, the airbag 22, 122 is in the uninflated position under normal operating conditions of the vehicle 20, e.g., the first member 24, 124 and the second member 30, 130 are in uninflated positions. In the event of an impact, the impact sensor 98 may detect the impact and transmit a signal through the communication bus 102 to the computer 100. The computer 100 may transmit a signal to the inflator 46. Upon receiving the signal, the inflator 46 may discharge and inflate the airbag 22, 122 with the inflation medium from the uninflated position to the inflated position, e.g., the first member 24, 124 and the second member 30, 130 may be inflated to the inflated positions.

The adjectives "first" and "second" are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
a first member inflatable to an inflated position in which the first member has a first and a second distal edge spaced from each other along a vehicle-longitudinal axis;
a second member inflatable to an inflated position, the second member in the inflated position being on a cross-vehicle axis that extends through the first distal edge;
a one-way vent permitting fluid flow from the first member to the second member; and
a pillar between and abutting the first member and the second member in the inflated positions.

2. The vehicle of claim 1, wherein the pillar includes a handle between the first member and the second member in the inflated positions.

3. The vehicle of claim 1, wherein the first member includes a panel and the second member includes a panel, the panel of the first member adhesively fixed to the panel of the second member and including a plurality of bumps along a perimeter surrounding the one-way vent.

4. The vehicle of claim 1, wherein the first member includes a hole, and the one-way vent includes a strap covering the hole.

5. The vehicle of claim 4, wherein the second member includes a panel having a pair of slits with the strap therebetween.

6. The vehicle of claim 1, wherein the one-way vent extends from the first member into the second member and defines a passage elongated from a first end to a second end.

7. The vehicle of claim 1, wherein the second member in the inflated position extends away from the second distal edge and past the first distal edge.

8. An airbag, comprising:
a first member inflatable to an inflated position in which the first member has a first and a second distal edge spaced from each other along a first axis, the first member in the inflated position including a panel;
a second member inflatable to an inflated position, the second member in the inflated position being on a second axis that is perpendicular to the first axis and extends through the first distal edge, the second member in the inflated position including a panel abutting the panel of the of the first member; and
a one-way vent permitting fluid flow from the first member to the second member;
wherein the panel of the first member is adhesively fixed to the panel of the second member at a perimeter surrounding the one-way vent; and
wherein one of the panel of the first member and the panel of the second member includes a plurality of bumps along the perimeter surrounding the one-way vent.

9. The airbag of claim 8, wherein the panel of the first member includes a hole, and the one-way vent includes a strap covering the hole.

10. The airbag of claim 9, wherein the panel of the second member includes a pair of slits with the strap therebetween.

11. The airbag of claim 9, wherein the panel of the second member and the strap are monolithic.

12. The airbag of claim 8, wherein the one-way vent includes a first panel and a second panel elongated between a first end and a second end and defining a passage extending from the first end to the second end.

13. The airbag of claim 12, wherein the one-way vent extends from the first member into the second member.

14. The airbag of claim 12, further comprising a tether in the second member and having a first end fixed to the one-way vent and a second end fixed to the second member.

15. The airbag of claim 12, wherein the first panel and the second panel of the one-way vent each include a hole at the second end.

16. The airbag of claim 8, wherein the first member includes a second panel, and the one-way vent is fixed to the panel and the second panel of the first member.

17. An airbag, comprising:
a first member inflatable to an inflated position in which the first member has a first and a second distal edge spaced from each other along a first axis;
a second member inflatable to an inflated position, the second member in the inflated position being on a second axis that is perpendicular to the first axis and extends through the first distal edge; and
a one-way vent permitting fluid flow from the first member to the second member, the one-way vent including a first panel and a second panel elongated between a first end and a second end and defining a passage extending from the first end to the second end.

18. The airbag of claim 17, wherein the one-way vent extends from the first member into the second member.

19. The airbag of claim 17, further comprising a tether in the second member and having a first end fixed to the one-way vent and a second end fixed to the second member.

20. The airbag of claim 17, wherein the first panel and the second panel of the one-way vent each include a hole at the second end.

* * * * *